United States Patent [19]

Campbell et al.

[11] 3,770,056

[45] Nov. 6, 1973

[54] METHOD OF INCREASING RECOVERY OF PETROLEUM FROM SUBTERRANEAN FORMATIONS

[75] Inventors: David W. Campbell; Robert R. Matthews, both of Ponca City, Okla.

[73] Assignee: Continental Oil Company, Ponca City, Okla.

[22] Filed: July 2, 1971

[21] Appl. No.: 159,522

[52] U.S. Cl. ................................................ 166/273
[51] Int. Cl. ............................................. E21b 43/16
[58] Field of Search .................... 166/273, 274, 275

[56] References Cited
UNITED STATES PATENTS

| | | | |
|---|---|---|---|
| 3,638,728 | 2/1972 | Hill | 166/273 |
| 3,437,141 | 4/1969 | Brandner | 166/273 |
| 3,446,282 | 5/1969 | Cooke | 166/274 |
| 3,520,365 | 7/1970 | Jones | 166/273 |
| 3,421,582 | 1/1969 | Fallgatter | 166/273 |
| 3,500,921 | 3/1970 | Abrams | 166/273 |
| 3,527,301 | 9/1970 | Raifsnider | 166/274 |
| 3,618,664 | 11/1971 | Harvey | 166/274 |
| 3,648,774 | 3/1972 | Kirk | 166/305 R |

*Primary Examiner*—Robert L. Wolfe
*Attorney*—Joseph C. Kotarski et al.

[57] ABSTRACT

Tertiary or secondary waterflood method wherein there is injected into the formation prior to the main aqueous drive fluid a slug of a thickened aqueous solution and a slug of concentrated surfactant solution, said slugs being injected either as a mixture or sequentially.

4 Claims, No Drawings

METHOD OF INCREASING RECOVERY OF PETROLEUM FROM SUBTERRANEAN FORMATIONS

BACKGROUND OF THE INVENTION

1. Field of the Invention

The invention relates to the secondary and tertiary recovery of petroleum from subterranean formations and more particularly to an improved waterflooding process.

2. Description of the Prior Art

Waterflooding of partially depleted hydrocarbon-bearing subterranean formations has long been practiced in many variations. Broadly the basic process involves injecting an aqueous medium into one or more injection wells penetrating the formation and forcing the aqueous medium through the formation toward one or more production wells similarly penetrating the formation. Formation fluids are recovered through the production wells. It has been suggested to inject a slug of thickened water ahead of the main body of waterflood medium. It has also been suggested to inject a slug of surfactant also referred to as a surface active or wetting agent ahead of the main body of waterflood medium or add such a surfactant to the main body of the waterflood medium. However, regardless of the particular waterflood technique used, a substantial part of the oil remains in place in the formation, i.e., is not recovered by the second recovery process.

It is an object of this invention to provide a secondary waterflood or tertiary recovery process wherein a higher proportion of the oil in the formation is recovered. It is a further object to provide such a process which recovers a given amount of oil in a shorter period of time. It is a still further object to provide such a process which recovers a given amount of oil by injecting a smaller volume of tertiary recovery medium. Other objects, advantages and features of the invention will become apparent from the following description and claims.

BRIEF SUMMARY OF THE INVENTION

The invention comprises a secondary or tertiary recovery process for a petroleum-bearing subterranean formation penetrated by a plurality of wells comprising:
a. injecting into such a formation via an injection well a slug of a thickened aqueous solution,
b. injecting into the formation via the injection well a slug of concentrated surfactant solution,
c. injecting a waterflood drive solution, and
d. producing fluids from the formation via a production well.

The slug of a thickened aqueous solution may be injected prior to the slug of concentrated surfactant solution, or the two solutions may be mixed and injected as a single slug.

DESCRIPTION OF THE PREFERRED EMBODIMENTS

One of the problems associated with previous waterflood methods has been that the flooding medium has often had a lower viscosity than the formation hydrocarbons being displaced. Thus the flooding medium tends to bypass or finger around a portion of the hydrocarbons which remain trapped in the formation. One way to alleviate this bypassing is by thickening or increasing the viscosity of the initially injected portion of the waterflood medium by adding therego any of a number of known thickeners such as polysaccharides, natural or artificial gums — for example, guar gum, cellulose derivatives such as carboxymethyl cellulose, and water soluble partially hydrolyzed polyacrylamide polymers. Such polymers are preferred in that they not only thicken an aqueous waterflood medium but also have been reported to reduce a formation's permeability to water while having little effect on oil permeability. This phenomenon may be desirable in some instances but is undesirable in others, such as injecting an aqueous drive fluid into a formation wherein the polymer may cause an undesirable decrease in the rate at which the drive fluid may be injected.

The partially hydrolyzed acrylamide polymers useful in this invention are well known in the art. They are water-soluble acrylamide polymers which have been hydrolyzed to such an extent that between about 0.8 and about 10 percent of the amide groups have been converted to carboxyl groups. In addition to homopolymers of acrylamide, water-soluble copolymers of acrylamide with up to about 15 percent by weight of other polymerizable vinyl compounds such as styrene, vinyl acetate, acrylonitrile, vinyl alkyl ethers, vinyl chloride, vinylidene chloride, methacrylamide, alkyl esters of acrylic and methacrylic acids and the like. These copolymers can conveniently be prepared using a polymerization catalyst such as benzoyl peroxide. The polymers should be of sufficiently high molecular weight so that a 0.5 percent by weight aqueous solution thereof has a viscosity of at least 4 and preferably at least 10 centipoises at 21.5° C as measured using an Ostwald viscometer. Such polymers and their use in waterflooding are described in the literature.

The thickened aqueous solution may be made from fresh water but is often a brine solution such as a solution of sodium chloride or other salt in water. The brine may be prepared by adding the desired salts to water or there may be used a natural brine such as one produced from a subterranean formation or present in a lake or other body of water. Enough thickener is added to increase the viscosity of the aqueous solution to at least about 1 centipoise. Preferably the aqueous solution should have a viscosity approximately equal to the viscosity of the oil in the formation, e.g., about 10 to 1,000 cps. The amount of thickener required to achieve such a viscosity depends on the particular thickener employed and is well known in the art. Generally from 0.1 to 1.5 percent by weight thickener is satisfactory. With the especially effective polyacrylamide type thickeners from 0.03 to 1.0 percent by weight can be used. Below the suggested lower limits the viscosity of the composition is not increased enough to be more effective than nonthickened compositions. Above the suggested upper limits the viscosity of the composition becomes so great that it is difficult to inject the composition through the formation. The size of the slug should be 2 to 20 percent of the pore volume. Slug sizes of less than 2 percent of the pore volume are too small to maintain their integrity when passed through the formation a significant distance, i.e., due to their small size they tend to breakdown quickly and allow the subsequently injected drive fluid to finger through. Slug sizes of more than 20 percent of the pore volume become quite expensive. It is more economical and just as effective to push the slug through the formation with an unthickened drive fluid rather than to further increase the slug size.

It is also known in various waterflooding procedures to inject a surfactant or surface active agent along with the aqueous drive fluid. Any of a wide variety of water-soluble surface active agents may be used. These include anionic, nonionic, cationic and amphoteric types. For example:

A. NONIONIC

I. Products obtained by autocondensation of various fatty matter and their derivatives with ethylene oxide, propylene oxide, glycols, or glycerols:
   a. a fatty acid plus ethylene oxide or glycerol, such as palmitic acid plus 5 moles ethylene oxide or glycerol monostearate;
   b. an alcohol plus ethylene oxide, such as hydroabietyl alcohol plus 15 moles ethylene oxide;
   c. an ester or aldehyde plus ethylene oxide;
   d. an amide or amine plus ethylene oxide, such as diethanolamine plus 15 moles ethylene oxide.
II. Products obtained by condensation of phenolic compounds having lateral chains with ethylene or propylene oxide. Examples are disecbutyl phenol plus 10 moles ethylene oxide and octyl phenol plus 12 moles ethylene oxide.

B. CATIONIC

I. Neutralization product of primary, secondary or tertiary amine with an acid such as trimethyl octyl ammonium chlorides, lauryl dimethyl benzyl ammonium chloride and the like, commonly referred to as quaternary ammonium chlorides.

C. ANIONIC

I. Alkyl aryl sulfonates such as ammonium isopropyl benzene sulfonate;
II. Fatty alcohol sulfates such as sodium 2 - methyl - 7 - ethyl - 4 - hendecyl sulfate;
III. Sulfated and sulfonated amides and amines such as sodium N - methyl - N - oleyl taurate;
IV. Sulfated and sulfonated esters and ethers such as dioctyl sodium sulfo succinate;
V. Alkyl sulfonates such as sodium dodecyl sulfonate.

D. AMPHOLYTIC

I. Molecules where the molecule as a whole forms a zwitterion, such as cetylaminoacetic acid.

A reference book which describes many types of surfactants suitable as foaming agents is "Surface Active Agents and Detergents," Volumes I and II, by Schwartz et al., Interscience Publishers.

Especially useful is a di-n-alkaryl sulfonate, more specifically a di-n-alkylbenzene sulfonate, wherein the alkyl groups have from 11 to 15 carbon atoms. The sulfonate is neutralized with sodium hydroxide. This material is referred to as "Sulfonate A" in the tests described below.

The concentrated surfactant solution may also be made using either fresh water or a brine. The concentration of the surfactant in the aqueous medium should be from about 5 to about 50 percent by weight, preferably from 10 to 20 percent. Solutions containing less than the minimum suggested amount of surfactant are relatively ineffective in removing oil from the formation. Solutions containing more than the maximum suggested amount of surfactant do not result in the recovery of a correspondingly greater amount of oil and are therefore unnecessary. The size of the slug should be 0.5 to 10 percent of the pore volume. The reasons for the suggested range of pore size are the same as discussed above in connection with the thickened aqueous liquid.

Primary oil recovery results when the oil flows from the well naturally or can be removed by pumping. Secondary oil recovery results from the injection of some agent into the formation during or preceding production, such as a waterflood, gaseous or miscible drive fluid, in situ combustion and the like. After the secondary recovery operation, some oil still remains in the formation. Attempts to remove this remaining oil by further treatment is referred to as tertiary oil recovery.

It has been reported by some sources that injection of a thickened aqueous solution into the formation in a secondary recovery operation results in the recovery of some oil. However, this same composition used in a tertiary oil recovery process produces little or no tertiary oil. Injection of a surfactant slug followed by a drive fluid following a secondary recovery operation results in the production of some tertiary oil. The basis for this invention is that a surprisingly large amount of tertiary oil can be recovered following a secondary recovery operation if there is then injected into the formation a slug of a thickened aqueous solution followed by a slug of a concentrated surfactant solution, such slugs being injected either sequentially or after having been mixed together, and finally followed by an aqueous drive fluid. The reason for this improved recovery of tertiary oil is not completely understood. It is postulated that perhaps comicellization of the thickener of the thickened aqueous solution with the surfactant may occur. Thus the two components may stabilize each other against adsorption onto the formation rock allowing the tertiary recovery fluid to flow through the formation with a minimum amount of undesirable adsorption which can deplete the tertiary recovery fluid of its active components thus decreasing its effectiveness. Another possibility is that the surfactant may adsorb on the thickener of the thickened aqueous solution allowing the latter to act as a carrier to transport the surfactant through the formation with a minimum of undesirable adsorption onto the formation. Regardless of the mechanism involved, the use of the two treating agents together followed by a drive fluid results in a surprisingly greater tertiary oil recovery than if either one alone precedes the drive fluid.

EXAMPLES

To evaluate the procedures of this invention, the following laboratory tests were made. The lateral surface of a linear Berea sandstone core 12 × 2 × 2 inches, having a permeability of from 150 to 200 millidarcies and a pore volume of 145 cc, was coated with epoxy resin. The core was then positioned in a pressurized bomb so that fluid could be forced in one end of the core and out the other end. The core was first evacuated. Next, a brine containing 5 percent by weight sodium chloride was injected into the core under pressure to saturate the core. Next, 80 pale oil was injected until no more brine was produced from the core. Pale oil is a solvent-refined Mid-Continent oil. Eighty pale oil has a viscosity of 80 sabolt seconds universal at 100° F. Since no more water could be produced from the core, it was said to be at irreducible water saturation, IWS. The 5 percent sodium chloride brine was again injected into the core until no more pale oil was produced. The oil that was produced during this step is called secondary oil. At this point a slug of various additive was injected into the core followed by the 5 percent sodium chloride brine. The oil produced in this step was due entirely to the additive employed and is called tertiary oil.

In Example 1, below, the additive was a slug of Sulfonate A described above. The additive was followed by 5 percent sodium chloride brine drive fluid.

In Example 2, the additive was a polyacrylamide thickened 5 percent sodium chloride brine followed by Sulfonate A wherein the sulfonate was not added as a slug but rather was uniformly dispersed in the 5 percent sodium chloride brine drive fluid.

Examples 1 and 2 represent oil recovery techniques known in the prior art.

Examples 3 and 4 illustrate the techniques of the instant invention.

In Example 3 the additive was a mixture of polyacrylamide thickened 5 percent sodium chloride brine and a concentrated slug of Sulfonate A in 5 percent sodium chloride brine, followed by 5 percent sodium chloride brine drive fluid.

In Example 4 the additive was a slug of polyacrylamide thickened sodium chloride brine, followed by a concentrated slug of Sulfonate A in 5 percent sodium chloride brine, followed by 5 percent sodium chloride brine drive fluid.

It is readily apparent from these tests that the oil recovery technique of this invention, as illustrated by Examples 3 and 4, resulted in substantially more tertiary oil recovery than the prior art methods, as illustrated by Examples 1 and 2.

What is claimed is:

1. A tertiary oil recovery process for oil-bearing subterranean formations penetrated by at least one production well and by at least one injection well comprising:
   a. injecting into said formation via an injection well a slug of from 2 to 20 percent of the pore volume of the formation of an aqueous solution of from 0.03 to 1.0 percent by weight of a water soluble partially hydrolyzed polyacrylamide polymer,
   b. injecting into said formation via an injection well a slug of from 0.5 to 10 percent of the pore volume of the formation of an aqueous solution of from 5 to 50 percent by weight of a di-n-alkylbenzene sulfonate having alkyl groups containing from 11 to 15 carbon atoms,
   c. injecting into said formation via an injection well an aqueous waterflood drive fluid, and
   d. producing fluids from said formation via a production well.

2. The process of claim 1 wherein the slug of aqueous solution of said polyacrylamide polymer is injected into the formation prior to the slug of aqueous solution of said sulfonate.

3. The process of claim 1 wherein the slug of aqueous solution of said polyacrylamide polymer and the slug of said sulfonate are mixed prior to being injected.

4. An oil recovery process following primary production for petroleum-bearing subterranean formations penetrated by a plurality of wells comprising:
   a. injecting into said formation via an injection well a slug of a thickened aqueous solution,
   b. injecting into said formation via said injection well a slug of a di-n-alkylbenzene sulfonate surfactant having alkyl groups containing from 11 to 15 carbon atoms,
   c. injecting into said formation via an injection well a waterflood drive fluid, and
   d. producing fluids from said formation via a production well.

TABLE I

| Example | Tertiary recovery additive (percent pore volume) | Cumulative pore volume tertiary oil recovered per cumulative pore volume of injected tertiary recovery additive (percent pore volume) | | | | | | | |
|---|---|---|---|---|---|---|---|---|---|
| | | 0.2 | 0.4 | 0.6 | 0.8 | 1.0 | 1.2 | 1.4 | 1.6 |
| 1 | 2 Sulfonate A | 0.0 | 0.036 | 0.056 | 0.064 | 0.067 | 0.067 | 0.067 | 0.067 |
| 2 | 8 polyacrylamide [1], followed by 1.5 Sulfonate A dispersed in drive fluid | 0.0 | 0.011 | 0.03 | 0.044 | 0.052 | 0.060 | 0.064 | 0.065 |
| 3 | 8 polyacrylamide [1] plus 1.5 Sulfonate A, followed by drive fluid | 0.006 | 0.085 | 0.16 | 0.112 | 0.114 | 0.114 | 0.115 | 0.115 |
| 4 | 8 polyacrylamide [1], followed by 1.5 Sulfonate A and concentrated slug, followed by drive fluid. | 0.005 | 0.080 | 0.14 | 0.108 | 0.112 | 0.112 | 0.114 | 0.114 |

[1] Added as a solution of 500 parts per million 30 percent hydrolyzed polyacrylamide polymer in 5 percent sodium chloride brine.

Although various embodiments of the invention have been described, it will be understood, of course, that the invention is not limited thereto; but many modifications may be made in the process conditions without departing from the spirit and scope of the invention. The examples are given by way of illustration only, and the invention is limited only by the terms of the appended claims.